(12) United States Patent
Liu (10) Patent No.: US 12,016,055 B2
(45) Date of Patent: Jun. 18, 2024

(54) RANDOM ACCESS METHOD AND DEVICE, AND COMPUTER READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 405 days.

(21) Appl. No.: 17/593,843

(22) PCT Filed: Mar. 29, 2019

(86) PCT No.: PCT/CN2019/080345
§ 371 (c)(1),
(2) Date: Sep. 25, 2021

(87) PCT Pub. No.: WO2020/198912
PCT Pub. Date: Oct. 8, 2020

(65) Prior Publication Data
US 2022/0183071 A1 Jun. 9, 2022

(51) Int. Cl.
*H04W 56/00* (2009.01)
*H04W 72/1268* (2023.01)
*H04W 74/0833* (2024.01)

(52) U.S. Cl.
CPC ... *H04W 74/0833* (2013.01); *H04W 72/1268* (2013.01)

(58) Field of Classification Search
CPC ............ H04W 74/0833; H04W 72/1268

USPC ..................................................... 370/329
See application file for complete search history.

(56) References Cited

U.S. PATENT DOCUMENTS

| 2018/0227805 | A1  | 8/2018 | Jang et al. |
| 2019/0132882 | A1* | 5/2019 | Li ............ H04W 74/0833 |
| 2020/0146069 | A1* | 5/2020 | Chen ......... H04W 52/362 |

FOREIGN PATENT DOCUMENTS

| CN | 108631971 A | 10/2018 |
| EP | 3358901 A1  | 8/2018  |

OTHER PUBLICATIONS

"Shen, CN 111586707, Random Access Process Switching Method, Device and System, May 24, 2022" (Year: 2019).*
ISA State Intellectual Property Office of the People's Republic of China, International Search Report (ISR) mailed in Application No. PCT/CN2019/080345 on Dec. 27, 2019.
(Continued)

*Primary Examiner* — Sai Ming Chan
(74) *Attorney, Agent, or Firm* — Syncoda LLC; Feng Ma (57) ABSTRACT

A random access method method includes: an access network device receiving a message A that is sent by a terminal, the message A comprising a random access preamble sequence and physical uplink shared channel (PUSCH) data; the access network device sending a first response message or a second response message, the first response message being used to instruct the terminal to send message 3 in a 4-step random access process, the second response message being used to instruct the terminal to send a re-transmission message of the message A, and the re-transmission message at least comprising the PUSCH data.

19 Claims, 6 Drawing Sheets

(56) References Cited

OTHER PUBLICATIONS

ZTE, "Summary of 7.2.1.2 Procedure for Two-step RACH (R1-1903436)" 3GPP TSG RAN WG1 #96 R1 1903436 Athens, Greece, Feb. 25-Mar. 1, 2019.
InterDigital, "2-Step RACH Procedure (R2-1814008)" 3GPP TSG-RAN WG2 Meeting # 103bis R2-1814008 Chengdu, China, Oct. 8-12, 2018.
OPPO "5. 2-steps RACH procedure for NR-U (R2-1816263)" 3GPP TSG-RAN WG2 Meeting #104 R2-1816263 Spokane, USA, Nov. 12-16, 2018.
Extended European Search Report in Application No. 19923700.9, mailed on Mar. 17, 2022.
China 1st Office Action in Application No. 201980000571.6, mailed on Mar. 21, 2022.
3GPP TSG RAN WG1 Meeting #96, Athens, Greece, Feb. 25-Mar. 1, 2019, Source: CAICT, Title: A scheme of fallback from 2-step RACH to 4-step RACH (R1-1902918)—XP051600616A.
3GPP TSG RAN WG1 #96, Athens, Greece, Feb. 25-Mar. 1, 2019, Source: Sony, Title: Discussion on Procedure for 2-step RACH (R1-1902166).

\* cited by examiner

RANDOM ACCESS METHOD AND DEVICE, AND COMPUTER READABLE STORAGE MEDIUM

CROSS-REFERENCE TO RELATED APPLICATIONS

This application is a national stage of International Application No. PCT/CN2019/080345 filed on Mar. 29, 2019, the disclosure of which is hereby incorporated by reference in its entirety.

TECHNICAL FIELD

The present disclosure relates to the field of communication technologies, and in particular, to a random access method, device, and computer-readable storage medium.

BACKGROUND

Random access is a necessary procedure for establishing a wireless link between a terminal and a base station. Only after the random access procedure is completed, the terminal and the base station can perform regular data transmission. The terminal usually selects one type of random access procedure to initiate and complete the random access, and the random access procedure is relatively fixed.

SUMMARY

Embodiments of the present disclosure provide a random access method, device, and computer-readable storage medium.

According to a first aspect of the embodiments of the present disclosure, there is provided a random access method, and the method includes:

receiving, by an access network device, a message A sent by a terminal, wherein the message A includes a random access preamble sequence and physical uplink shared channel (PUSCH) data; and sending, by the access network device, a first response message or a second response message to the terminal when determining that the PUSCH data in the message A fails to be parsed, wherein the first response message is used to indicate the terminal to send a message 3 in a 4-step random access procedure, the second response message is used to indicate the terminal to send a retransmission message of the message A, and the retransmission message includes at least the PUSCH data.

According to a second aspect of the embodiments of the present disclosure, there is provided a random access method, and the method includes:

sending, by a terminal, a message A to an access network device, wherein the message A includes a random access preamble sequence and PUSCH data; and receiving, by the terminal, a first response message or a second response message sent by the access network device, wherein the first response message is used to indicate the terminal to send a message 3 in a 4-step random access procedure, the second response message is used to indicate the terminal to send a retransmission message, and the retransmission message includes at least the PUSCH data.

According to a third aspect of the embodiments of the present disclosure, there is provided a random access device, and the device includes:

a receiving module, configured to receive a message A sent by a terminal, wherein the message A includes a random access preamble sequence and PUSCH data; and a sending module, configured to send a first response message or a second response message to the terminal when determining that the PUSCH data in the message A fails to be parsed, wherein the first response message is used to indicate the terminal to send a message 3 in a 4-step random access procedure, the second response message is used to indicate the terminal to send a retransmission message of the message A, and the retransmission message includes at least the PUSCH data.

According to a fourth aspect of the embodiments of the present disclosure, there is provided a random access device, and the device includes:

a sending module, configured to send a message A to an access network device, wherein the message A includes a random access preamble sequence and PUSCH data; and a receiving module, configured to receive a first response message or a second response message sent by the access network device, wherein the first response message is used to indicate the terminal to send a message 3 in a 4-step random access procedure, the second response message is used to indicate the terminal to send a retransmission message, and the retransmission message includes at least the PUSCH data.

According to a fifth aspect of the embodiments of the present disclosure, there is provided a random access device, and the device includes: a processor; and a memory for storing executable instructions of the processor; wherein the processor is configured to load and execute the executable instructions to implement the random access method provided in the foregoing first aspect.

According to a sixth aspect of the embodiments of the present disclosure, there is provided a random access device, and the device includes: a processor; and a memory for storing executable instructions of the processor; wherein the processor is configured to load and execute the executable instructions to implement the random access method provided in the foregoing second aspect.

According to a seventh aspect of the embodiments of the present disclosure, there is provided a computer-readable storage medium, and instructions in the computer-readable storage medium, when executed by a processor, is capable of executing the random access method described in the first aspect or the random access method described in the second aspect.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of the disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

A random access procedure refers to a procedure from a user sending a random access preamble sequence to try to access a network until a basic signaling connection is established with the network, and is used to enable the terminal to establish data communication with the network side. The random access procedure is classified into a contention based random access procedure and a non-contention based random access procedure. At present, most terminals adopt the contention based random access procedure. The contention based random access procedure includes a 4-step random access procedure and a 2-step random access procedure. The following separately introduces the two contention based random access procedures first.

Figure 1:
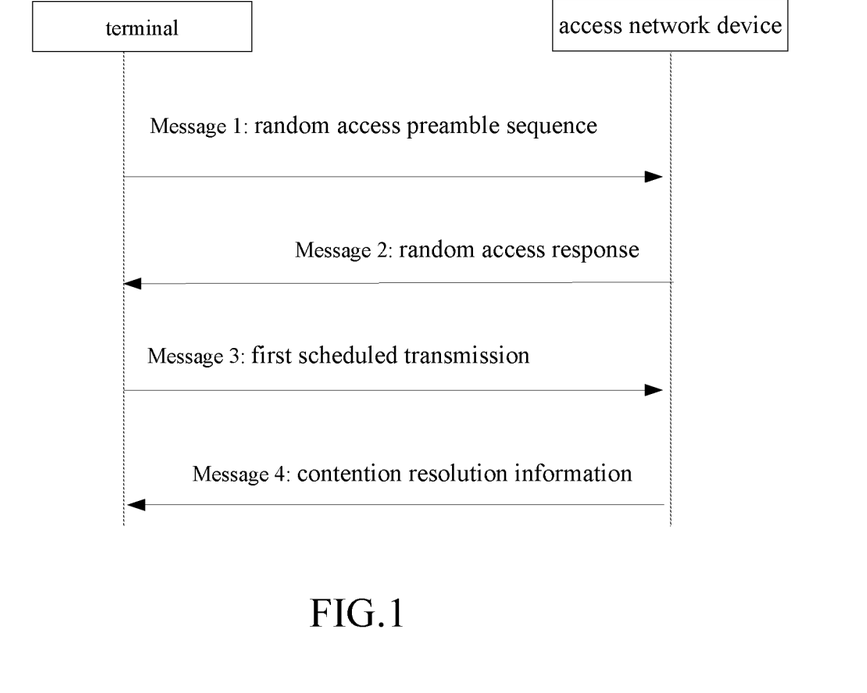
FIG. 1 is a flowchart of a contention based 4-step random access procedure.

When the contention based random access procedure is completed in four steps, each step is a message (Msg). In the standard, these four steps are referred as to Msg1~Msg4. FIG. 1 is a flowchart of a contention based 4-step random access procedure, and as shown in FIG. 1, the 4-step random access procedure includes:

In a first step, the terminal sends the Msg1 to an access network device. The Msg1 includes the random access preamble sequence.

The total number of available random access preamble sequences in each cell is 64. Two subsets are defined in these 64 random access preamble sequences, and a random access preamble sequence set of each subset is notified to the terminal as a part of a system message. When a contention based random access is performed, the terminal can arbitrarily select a random access preamble sequence from these two subsets and send it on a physical random access channel (PRACH) resource (that is, a time-frequency resource).

The random access preamble sequence available for the contention based random access and the PRACH resource used for sending the random access preamble sequence are configured by the access network device, and a configuration result is notified to the terminal in the cell through a system message.

In a second step, the access network device sends the Msg2 to the terminal. The Msg2 includes a random access response (RAR).

One Msg2 can contain identities (i.e., index values) of multiple preamble sequences sent by different terminals, and respond to random access requests from multiple terminals at the same time. The terminal determines whether it has received the random access response by detecting whether the Msg2 carries the identity of the preamble sequence sent by the terminal.

The access network device uses a physical downlink control channel (PDCCH) to schedule the Msg2, and uses a dedicated random access radio network temporary identity (RA-RNTI) for addressing (also known as scrambling). The RA-RNTI is determined by a time-frequency resource position of the PRACH carrying the Msg1.

The message 2 may include a parameter such as an identity of a random access preamble sequence corresponding to the Msg1, uplink transmission timing advance, an uplink resource allocated for the terminal, and a temporary cell radio network temporary identity (C-RNTI).

In a third step, the terminal sends the Msg3 to the access network device.

After receiving the Msg2 correctly, the terminal transmits the Msg3 in the allocated uplink resource in the Msg2 to complete a first scheduled transmission.

The Msg3 may include identity identification information of the terminal, such as a C-RNTI identity or the temporary C-RNTI identity.

In a fourth step, the access network device sends the Msg4 to the terminal.

The access network device and the terminal complete final contention resolution through the Msg4. The content of the Msg4 corresponds to that of the Msg3.

If the terminal is not allocated with the C-RNTI, the access network device may use a PDCCH scrambled by the temporary C-RNTI to schedule the Msg4. The terminal uses the temporary C-RNTI to address on the PDCCH to obtain a time-frequency resource position of the Msg4. After successful addressing, the terminal obtains the Msg4 from the time-frequency resource position. The Msg4 carries a contention resolution identity (CRI) through a media access control (MAC) layer control element (CE). After receiving the MAC CE, the terminal compares it with the identity identification information sent by the terminal in the Msg3. If the two are the same, it is determined that the contention resolution is successful, and the terminal determines that the random access is completed.

If the terminal has been allocated with the C-RNTI, the access network device may use a PDCCH scrambled by the C-RNTI to schedule the Msg4. The terminal uses the C-RNTI to address on the PDCCH. If the addressing is successful, it indicates that the contention resolution is successful, and the terminal determines that the random access is completed.

Figure 2:
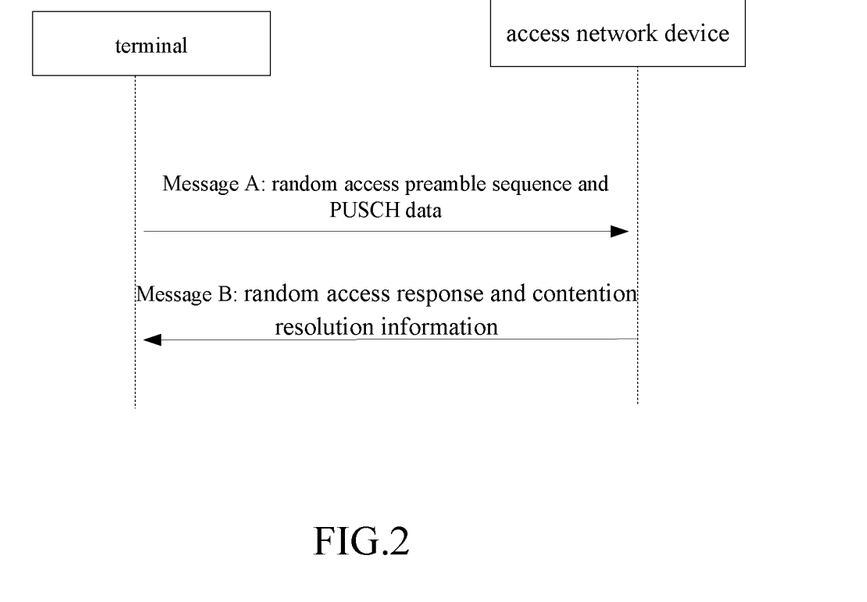
FIG. 2 is a flowchart of a contention based 2-step random access procedure.

The 2-step random access procedure can be a combination of the 4-step random access procedure. FIG. 2 is a flowchart of a contention based 2-step random access procedure. As shown in FIG. 2, the 2-step random access procedure includes:

In a first step, the terminal sends the MsgA to the access network device, and the access network device receives the MsgA.

The MsgA includes the random access preamble sequence and physical uplink shared channel (PUSCH) data. The PUSCH data may include identity identification information of the terminal, such as C-RNTI. That is, the MsgA includes content of the Msg1 and Msg3.

In a second step, the access network device sends the MsgB to the terminal, and the terminal receives the MsgB.

The MsgB includes the random access response and contention resolution information. That is, the MsgB includes content of the Msg2 and Msg4. The random access response includes the identity of the random access preamble sequence, and the contention resolution information may include the contention resolution identity.

In the related art, the terminal usually can only select one of the 4-step random access procedure and the 2-step random access procedure for random access, and the random access procedure is relatively fixed without sufficient flexibility. To this end, the present disclosure provides the following embodiments.

Figure 3:
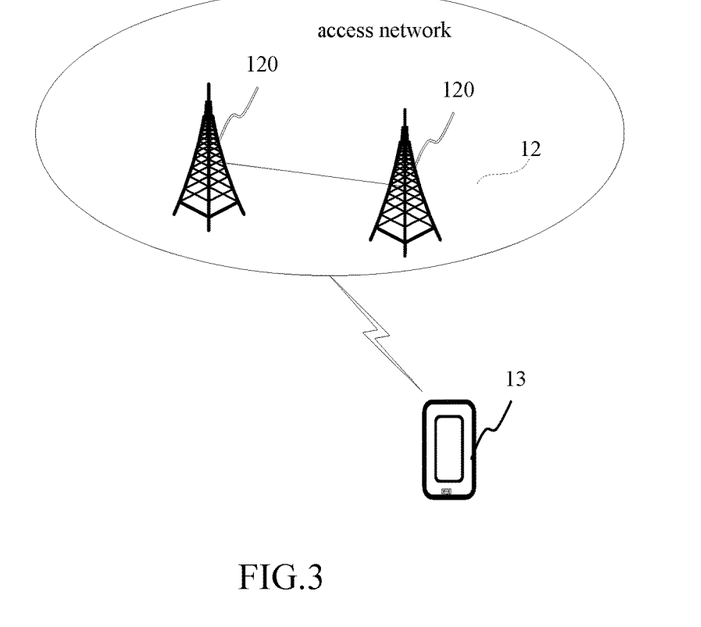
FIG. 3 is a schematic diagram of a network architecture provided by some embodiments of the present disclosure.

FIG. 3 shows a block diagram of a communication system provided by some embodiments of the present disclosure. As shown in FIG. 3, the communication system may include: an access network 12 and a terminal 13.

The access network 12 includes several access network devices 120. The access network device 120 may be a base station, and the base station is a device deployed in the access network and for providing a wireless communication function to the terminal. The base stations may include various forms of macro base stations, micro base stations, relay stations, access points, and the like. In systems adopting different radio access technologies, a device equipped with functions of the base station may have different names. For example, in a LTE system, it is called eNodeB or eNB; and in a 5G NR system, it is called as gNodeB or gNB. The name "base station" may change with the evolution of communication technologies. For the sake of easy description, the device that provides the wireless communication function to the terminal is collectively called as the access network device in the following.

The terminal 13 may include hand-held devices, on-board devices, wearable devices, and computing devices with the wireless communication function, or other processing devices connected to a wireless modem, as well as various forms of user equipment (UE), mobile stations (MS), terminal devices and so on. For the sake of easy description, the devices mentioned above are collectively referred to as terminals. The access network device 120 and the terminal 13 communicate with each other through a certain air interface technology, such as a Uu interface.

The communication system and service scenarios described in the embodiments of the present disclosure are to explain technical solutions of the embodiments of the present disclosure more clearly, and do not constitute a limitation to the technical solutions provided in the embodiments of the present disclosure. Those skilled in the art may know that the technical solutions provided in the embodiments of the present disclosure are equally applicable to similar technical problems as the communication system evolves and new service scenarios appear.

Figure 4:
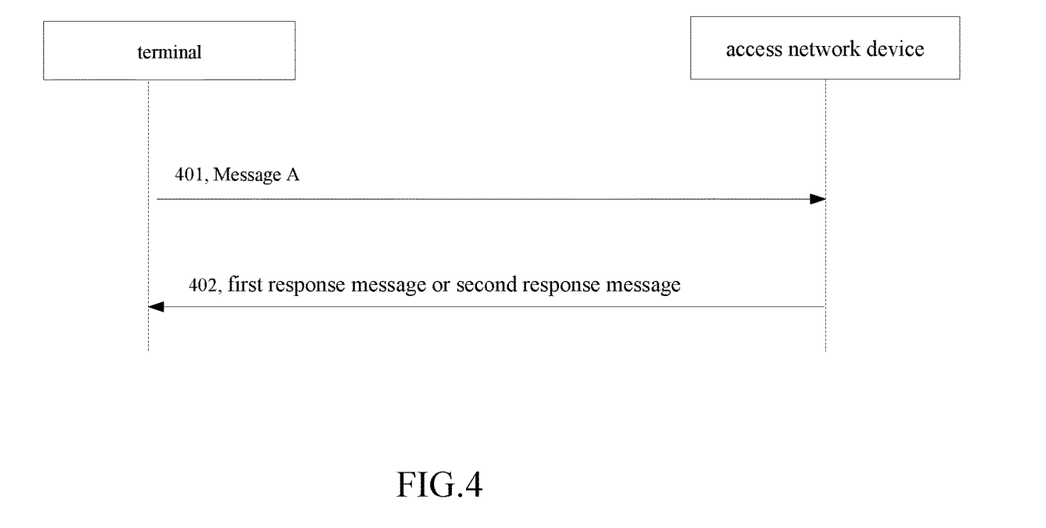
FIG. 4 is a flowchart showing a random access method according to some embodiments.

FIG. 4 is a flowchart showing a random access method according to some embodiments. Referring to FIG. 4, the method includes the following steps:

In step 401, the terminal sends a message A to the access network device, and the access network device receives the message A sent by the terminal.

The message A includes a random access preamble sequence and PUSCH data.

In some embodiments, the PUSCH data may include identity identification information of the terminal, such as C-RNTI, a temporary C-RNTI, and so on.

In step 402, the access network device sends a first response message or a second response message to the terminal when determining that the PUSCH data in the message A fails to be parsed.

Correspondingly, the terminal receives the first response message or the second response message sent by the access network device.

Here, the first response message is used to indicate the terminal to send a message 3 in a 4-step random access procedure, the second response message is used to indicate the terminal to send a retransmission message of the message A, and the retransmission message includes at least the physical uplink shared channel (PUSCH) data.

In some embodiments, the first response message is a message 2 in the 4-step random access procedure.

In some embodiments, the second response message is used for carrying physical downlink control information, such as resource allocation information, mapping information between a virtual resource block and a physical resource block, a modulation and coding scheme value, and a transport block proportion.

In some embodiments, scheduling information of the first response message is scrambled with first terminal identification information, scheduling information of the second response message is scrambled with second terminal identification information, and the first terminal identification information is different from the second terminal identification information.

In some embodiments, the scheduling information of the second response message includes at least one of retransmission indication information, time advance (TA) information, beam indication information, power indication information, and random access resource indication information, and the retransmission indication information is used to indicate the terminal to send a retransmission message including the PUSCH data, or to send a retransmission message including the random access preamble sequence and the PUSCH data.

In some embodiments, the method further includes: the access network device determines to send the first response message or send the second response message based on random access selection reference information, and the random access selection reference information includes at least one of a user type, an intra-cell interference level, a delay between the terminal and the access network device and a cell load amount.

In a possible implementation, the method further includes:
  the access network device receives the message 3 sent by the terminal, and the message 3 is sent by the terminal after receiving the first response message; and
  the access network device sends a message 4 to the terminal.

In another possible implementation, the method further includes:
  the access network device receives the retransmission message sent by the terminal, and the retransmission message is sent by the terminal after receiving the second response message; and
  the access network device sends a message B to the terminal.

Notably, the aforementioned steps 401-402 and the aforementioned other steps can be combined arbitrarily.

Figure 5:
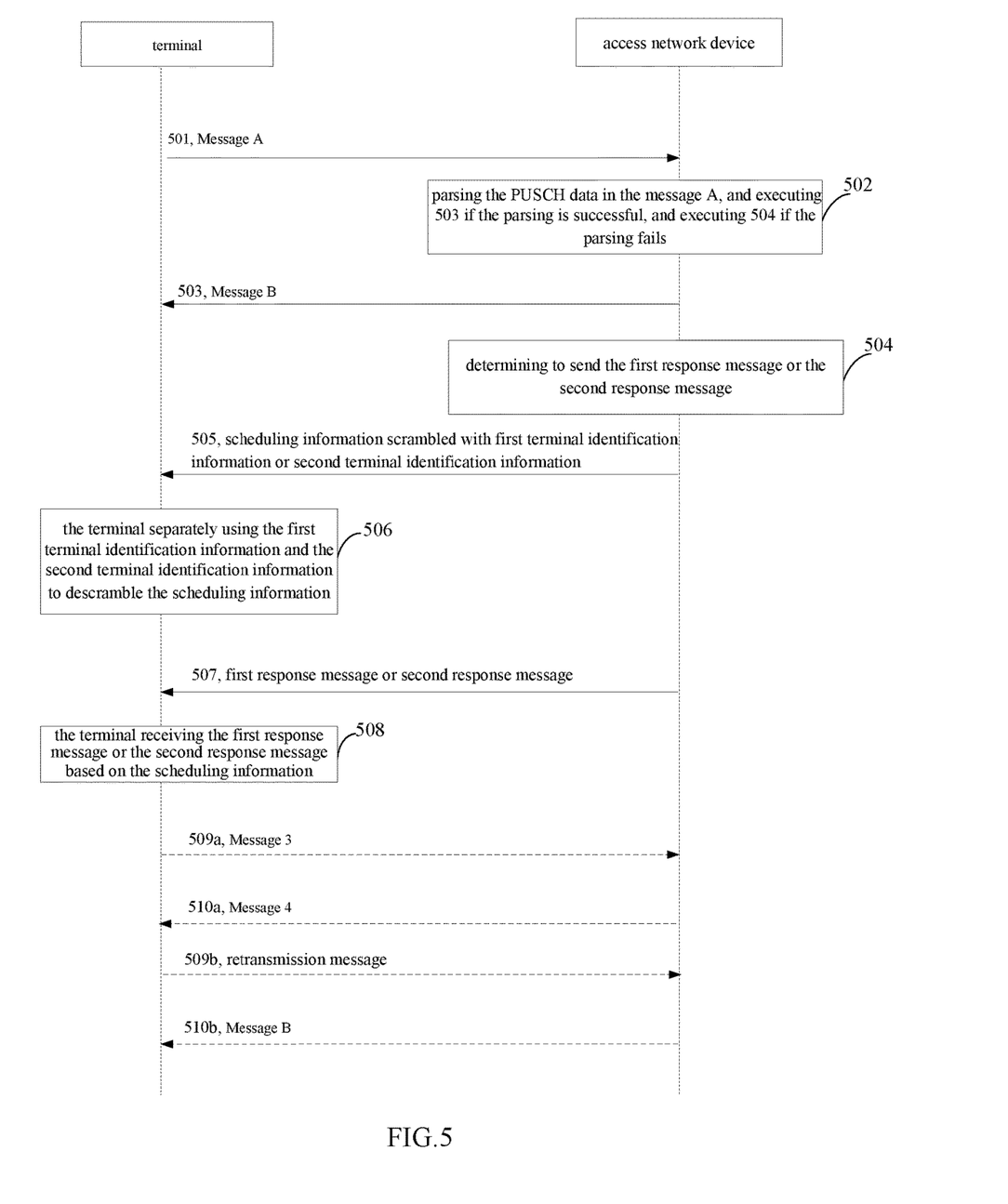
FIG. 5 is a flowchart showing a random access method according to some embodiments.

FIG. 5 is a flowchart showing a random access method according to some embodiments. Referring to FIG. 5, the method includes the following steps:

In step 501, the terminal sends a message A to the access network device, and the access network device receives the message A sent by the terminal.

The message A includes a random access preamble sequence and PUSCH data.

In some embodiments, the PUSCH data may include identity identification information of the terminal, such as C-RNTI, a temporary C-RNTI. In some embodiments, the PUSCH data may further include attribute information of the terminal, such as a user type. The user type can be classified into a low-latency user and a high-latency user.

In some embodiments, the terminal can use a pre-configured random access resource to send the first message.

In some embodiments, the random access resource includes at least one of a time-frequency resource and a code resource (that is, a sequence resource).

In some embodiments, the random access resource may be configured by the access network device through a system message. For example, a protocol agrees that available random access resources are of a first set, and the access network device may use a subset of the first set as the available random access resources and send it to the terminal through the system message.

In step 502, the access network device parses the PUSCH data in the message A. If the parsing is successful, step 503 is executed; and if the parsing fails, step 504 is executed.

In the step 503, the access network device sends MsgB to the terminal.

The MsgB may include a random access response and contention resolution information. The random access response includes an identity of the random access preamble sequence, and the contention resolution information may include a contention resolution identity.

In the step 504, the access network device determines to send the first response message or the second response message.

The first response message is used to indicate the terminal to send the Msg3 in a 4-step random access procedure, that is, the first response message is used to indicate the terminal to use the 4-step random access procedure for random access, and the second response message is used to indicate the terminal to send a retransmission message of the MsgA, that is, the second response message is used to indicate the terminal to continue to use the 2-step random access procedure for random access.

In some embodiments, the retransmission message may be part of the MsgA, for example, only including the PUSCH data. Alternatively, the retransmission message may be the whole message A, for example, including the random access preamble sequence and the PUSCH data.

Exemplarily, the first response message may be the Msg2, that is, the random access response message. The message 2 may include a parameter such as an identity of a random access preamble sequence corresponding to the Msg1, uplink transmission timing advance, an uplink resource allocated for the terminal, and a temporary C-RNTI.

In some embodiments, the second response message may be used for carrying physical downlink control indication information. For example, the second response message may include resource allocation information, and the resource allocation information may include time domain resource allocation information and frequency domain resource allocation information, and is used for allocating the time-frequency resource for sending the retransmission message to the terminal.

In some embodiments, the second response message may also include mapping information between a virtual resource block (VRB) and a physical resource block (PRB), a modulation and coding scheme (MCS) value, a transport block (TB) proportion and other information.

If the access network device correctly receives the random access preamble sequence in the message A, but cannot correctly parse the PUSCH data in the message A, this situation may be caused by the following factors, such as an incorrect TA used by the terminal to send the message A (that is, a sending time is inaccurate), a low signal-to-noise ratio, etc. The access network device may consider sending the first response message or the second response message according to an actual situation. For example, if the PUSCH data parsing failure is caused by the low signal-to-noise ratio, the first response message can be sent to indicate the terminal to use the 4-step random access procedure for random access; if the PUSCH data parsing failure is not caused by the low signal-to-noise ratio, the second response message can be sent to indicate the terminal to retransmit the PUSCH data; and if the PUSCH data parsing failure is caused by the inaccurate sending time, the first response message can be sent to indicate the terminal to use the 4-step random access procedure for random access.

In some embodiments, the access network device may determine to send the first response message or the second response message based on random access selection reference information. The random access selection reference information includes, but is not limited to, a user type, an intra-cell interference level, a delay between the terminal and the access network device, and a cell load amount.

The user type can be a low-latency user and a high-latency user. The intra-cell interference level can be determined based on the signal quality reported by multiple terminals in the cell. For example, if the signal quality reported by the multiple terminals in the cell is good, the intra-cell interference level is relatively low. If the signal quality reported by the multiple terminals in the cell is poor, the intra-cell interference level is relatively high. The delay between the terminal and the access network device may be a difference between an expected reception time and an actual reception time of a measurement signal by the access network device. The cell load amount can be the number of connected terminals in the cell or a ratio of the number of connected terminals to the maximum number of connectable terminals.

The random access selection reference information used by the access network device may be at least one of these pieces of information.

In some embodiments, any of these pieces of information can be used as the selection reference information. In some embodiments, the access network device may use one of these pieces of information as the random access selection reference information, for example, the intra-cell interference level may be used as the random access selection reference information. Since the high intra-cell interference level may seriously affect PUSCH data transmission and cause a greater possibility of PUSCH data parsing failure, the intra-cell interference level among such information may be used as the random access selection reference information.

In some embodiments, the step 504 may include: the access network device determines the user type of the terminal, and send a random access control message to the terminal based on the user type of the terminal. For example, if the terminal is the high-latency user, the first response message is sent; and if the terminal is the low-latency user, the second response message is sent. Here, the user type can be obtained from the attribute information of the terminal.

Alternatively, the step 504 may include: the access network device determines the intra-cell interference level; and determines to send the first response message or the second response message based on the intra-cell interference level. For example, the intra-cell interference level can be determined based on an average value of measured signal-to-noise ratios reported by the multiple terminals, and the intra-cell interference level can be negatively correlated with the average value, that is, the larger the average value, the lower the intra-cell interference level. Conversely, the smaller the average value, the higher the intra-cell interference level. In some embodiments, the intra-cell interference level may be represented by the reciprocal of the average value. Accordingly, the step 504 may include: if the intra-cell interference level exceeds an interference threshold, the first response message is sent; and if the intra-cell interference level does not exceed the interference threshold, the second response message is sent. For another example, the intra-cell interference level may also be represented by the average value of the measured signal-to-noise ratios reported by the multiple terminals. Accordingly, the step 504 may include: if the intra-cell interference level is lower than the interference threshold, the first response message is sent; and if the intra-cell interference level is not lower than the interference threshold, the second response message is sent.

Alternatively, the step 504 may include: the access network device determines a delay value between the terminal and the access network device, and determines to send the first response message or the second response message based on the delay value. For example, if the delay value corresponding to the terminal is greater than a delay threshold, the first response message is sent; and if the delay value corresponding to the terminal is not greater than the delay threshold, the second response message is sent. The delay value here can be obtained by measurement. For example, the terminal can use a downlink channel measurement to estimate the delay value, and then report the estimated delay value to the access network device. The delay value can be used to reflect a TA value used by the terminal to send the message A. If the delay value is greater than the delay threshold, it indicates that the parsing failure may be caused by the inaccurate sending time.

Alternatively, the step 504 may include: the access network device determines the cell load amount, and determines to send the first response message or the second response message based on the cell load amount. For example, if the cell load amount exceeds a load threshold, the first response message is sent; and if the cell load amount does not exceed the load threshold, the second response message is sent.

In some embodiments, the access network device may also use a variety of information as the random access selection reference information. For example, the intra-cell interference level and one or more of other pieces of information is used as the random access selection reference information.

For example, the intra-cell interference level and the user type can be used as the random access selection reference information. In this case, the step 504 may include: the access network device determines the intra-cell interference level; if the intra-cell interference level exceeds the interference threshold, the first response message is sent; and if the intra-cell interference level does not exceed the interference threshold, the access network device determines the user type of the terminal. If the terminal is the high-latency user, the first response message is sent; and if the terminal is the low-latency user, the second response message is sent.

For another example, the intra-cell interference level and the delay between the terminal and the access network device may be used as the random access selection reference information. In this case, the step 504 may include: the access network device determines the intra-cell interference level; if the intra-cell interference level exceeds the interference threshold, the first response message is sent; and if the intra-cell interference level does not exceed the interference threshold, the access network device determines the delay value between the terminal and the access network device. If the delay value corresponding to the terminal is greater than the delay threshold, the first response message is sent; and if the delay value corresponding to the terminal is not greater than the delay threshold, the second response message is sent.

In step 505, the access network device sends scheduling information to the terminal.

In some embodiments, if the access network device determines to send the first response message, it may generate scheduling information scrambled with first terminal identification information; and send the generated scheduling information to the terminal. If the access network device determines to send the second response message, it may generate scheduling information scrambled with second terminal identification information; and send the generated scheduling information to the terminal. The first terminal identification information is different from the second terminal identification information.

That is, the scheduling information of the first response message can be scrambled with the first terminal identification information, and the scheduling information of the second response message can be scrambled with the second terminal identification information, and the first terminal identification information and the second terminal identification information are different.

Here, the first terminal identification information and the second terminal identification information both correspond to a position of the time-frequency resource for sending the random access preamble sequence (that is, a position of the PRACH, such as a sub-frame number where the PRACH is located, etc.). In some embodiments, the first terminal identification information and the second terminal identification information may be different RA-RNTIs, that is, in the embodiments of the present disclosure, one PRACH position corresponds to two different RA-RNTIs.

A correspondence between the position of the PRACH and the terminal identification information can be configured by the access network device and notified to the terminals in the cell through the system message.

The access network device uses the PDCCH to schedule the first response message and the second response message, that is, the scheduling information of the first response message and the scheduling information of the second response message are both carried by the PDCCH. The scheduling information of the first response message and the scheduling information of the second response message may be carried in downlink control information (DCI).

In some embodiments, the scheduling information of the second response message may include at least one of retransmission indication information, time advance information, beam indication information, power indication information, and random access resource indication information.

Here, the retransmission indication information is used to indicate the terminal to send the PUSCH or send the PUSCH and the random access preamble sequence. In some embodiments, the retransmission indication information may be a retransmission type indicator, and the retransmission type indicator may be a first value or a second value. The first value is used to indicate the terminal to send the PUSCH data; and the second value is used to indicate the terminal to send the PUSCH data and the random access preamble sequence. For example, the first value may be 0, and the second value may be 1.

The time advance information is used for indicating a timing advance value when the terminal sends the retransmission message.

The beam indication information is used for indicating a beam that the terminal can use to send the retransmission message. In some embodiments, the beam indication information may be a beam identity or a beam set identity.

The power indication information is used for indicating whether the terminal needs to adjust the power for sending the retransmission message. In some embodiments, the power indication information may be a power adjustment indicator, which is used to indicate to increase or decrease the power for sending the retransmission message. Alternatively, the power indication information may be a power adjustment value, which is used to indicate to adjust the power that is used to send the message A to the power adjustment value, that is, a sum of the power used to send the message A and the power adjustment value is used as the power to send the retransmission message. Alternatively, the power indication information may also be a power adjustment target value, which is used for to indicate the power for sending the retransmission message.

The random access resource indication information is used to indicate whether the terminal needs to adjust the random access resource used for sending the retransmission message. For example, the random access resource indication information may be identification information of the random access resource, which is used to indicate an available random access resource for sending the retransmission message. Alternatively, the random access resource indication information may be a mask, and the mask is used to indicate the available random access resource for sending the retransmission message. The mask is a set of binary values with a set length, and the length can be determined by the number of random access resources.

In step 506, the terminal separately uses the first terminal identification information and the second terminal identification information to descramble the scheduling information.

After sending the message A, the terminal separately uses the first terminal identification information and the second terminal identification information corresponding to the position of the PRACH used to send the message A for addressing on the PDCCH, that is, descrambling the scheduling information. If the addressing is successful by using the first terminal identification information, the time-frequency resource position for sending the first response message is determined according to the obtained scheduling information. If the addressing is successful by using the second terminal identification information, the time-frequency resource position for sending the second response message is determined according to the obtained scheduling information.

In some embodiments, in the step 506, the second terminal identification information may be preferentially used to descramble the scheduling information. If the scheduling information descrambling fails by using the second terminal identification information, the first terminal identification information is used to descramble the scheduling information. Since a probability of the access network device sending the second response message is greater than a probability of the access network device sending the first response message according to a determination method in the step 504, this can improve access efficiency of the terminal while reducing operations performed by the terminal.

Alternatively, in the step 506, the first terminal identification information and the second terminal identification information may also be used at the same time to descramble the scheduling information.

In step 507, the access network device sends the first response message or a second response message to the terminal.

If the access network device determines to send the first response message in the step 504, it is the first response message sent in the step 507; and if the access network device determines to send the second response message in the step 504, it is the second response message sent in the step 507.

In step 508, the terminal receives the first response message or the second response message based on the scheduling information.

On the time-frequency resource position determined according to the scheduling information, the first response message or the second response message is received, and it is detected whether the received response message carries the identity of the random access preamble sequence in the message A. If the response message on the time-frequency resource position used to send the first response message carries the identity of the random access preamble sequence in the message A, the terminal determines that the first response message is sent to itself, that is, the terminal determines that it has received the first response message. If the response message on the time-frequency resource position used to send the second response message carries the identity of the random access preamble sequence in the message A, the terminal determines that the second response message is sent to itself, that is, the terminal determines that it has received the second response message.

In the related art, one PRACH position corresponds to one RA-RNTI. In the embodiments of the present disclosure, a new RA-RNTI is additionally added to enable the terminal to distinguish between the first response message and the second response message, thereby realizing the access network device to control the random access procedure used by the terminal.

If in step 508, the terminal receives the first response message, the method further includes:

in step 509*a*, the terminal sends the Msg3 to the access network device, and the access network device receives the Msg3 sent by the terminal.

The Msg3 may include the identity identification information of the terminal, such as the C-RNTI identity or the temporary C-RNTI identity.

In step 510*a*, the access network device sends the Msg4 to the terminal, and the terminal receives the Msg4 sent by the access network device.

If the identity identification information of the terminal in the Msg3 is the C-RNTI identity, the access network device may use the C-RNTI to scramble the scheduling information of the Msg4. Since the C-RNTI identity of each terminal is unique, if the terminal uses its own C-RNTI identity to descramble successfully, it means that the random access is successful.

If the identity identification information of the terminal in the Msg3 is the temporary C-RNTI, the access network device may use the temporary C-RNTI to scramble the scheduling information of the Msg4. The terminal uses the temporary C-RNTI for addressing on the PDCCH, obtains the time-frequency resource position of the Msg4 after successful addressing, and obtains the Msg4 from the time-frequency resource position. The Msg4 carries the contention resolution identity through the MAC CE. After receiving the MAC CE, the terminal compares it with the identity identification information sent by the terminal in the Msg3. If the two are the same, it is determined that the contention resolution is successful, that is, the random access is successful.

If in step 508, the terminal receives the second response message, the method further includes:

In step 509b, the terminal sends the retransmission message of the message A to the access network device, and the access network device receives the retransmission message sent by the terminal.

In step 510b, the access network device sends the MsgB to the terminal, and the terminal receives the MsgB sent by the access network device.

The retransmission message includes at least the PUSCH data in message A.

In some embodiments, if the scheduling information of the second response message includes the retransmission indication information, and the retransmission indication information is used to indicate the terminal to send the retransmission message including the PUSCH data, the retransmission message sent by the terminal includes the PUSCH data but does not include the random access preamble sequence; and if the second response message includes the retransmission indication information, and the retransmission indication information is used to indicate the terminal to send the retransmission message including the random access preamble sequence and the PUSCH data, the retransmission message sent by the terminal includes the random access preamble sequence and the PUSCH data.

In the embodiments of the present disclosure, a format of the retransmission message may be the same as that of the message A.

It should be noted that the random access preamble sequence in the retransmission message is randomly selected by the terminal from a random access preamble sequence set, and the random access preamble sequence in the retransmission message and the random access preamble sequence in the message A belong to the same random access preamble sequence set (that is, a subset in the first step of the aforementioned 4-step random access procedure).

In some embodiments, if the scheduling information of the second response message includes TA information, the terminal adjusts a timing of sending the retransmission message based on a TA value indicated by the TA information.

In some embodiments, if the scheduling information of the second response message includes the beam indication information, the terminal uses the beam corresponding to the beam indication information to send the retransmission message.

In some embodiments, if the scheduling information of the second response message includes the power indication information, the terminal adjusts the power for sending the retransmission message according to the power indication information.

In some embodiments, if the scheduling information of the second response message includes the random access resource indication information, the random access resource indicated by the random access resource indication information is used to send the retransmission message. In some embodiments, when the random access resource indication information is the identification information of the random access resource, the terminal directly uses the random access resource corresponding to the identification information of the random access resource to send the retransmission message. When the random access resource indication information is the mask, the terminal needs to use the mask to perform a bitwise AND operation with the attribute information (for example, identity) of the random access resource to distinguish which random access resource is available.

In the embodiments of the present disclosure, during the random access procedure, after receiving the message A sent by the terminal, the base station can control the terminal whether to continue to use the 2-step random procedure for random access, or to use the 4-step random access procedure for random access by sending the first response message or the second response message if the PUSCH data in the message A cannot be parsed, thereby achieving flexible control. If the base station sends the first response message as a response to message A to the terminal, the terminal may send the message 3 under the indication of the first response message, and perform the random access through the 4-step random access procedure. If the base station sends the second response message as the response to the message A to the terminal, the terminal may send the retransmission message of the message A under the indication of the second response message, and continue to use the 2-step random procedure for random access.

Figure 6:
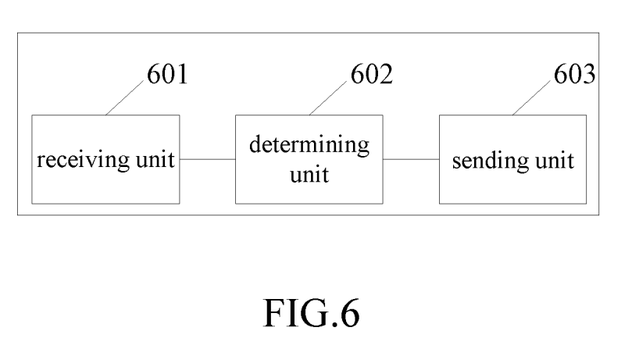
FIG. 6 is a schematic structural diagram showing a random access device according to some embodiments.

FIG. 6 is a schematic structural diagram showing a random access device according to some embodiments. The device has a function of realizing the access network device in the above method embodiments, and the function can be realized by hardware, or by hardware executing corresponding software. As shown in FIG. 6, the device includes: a receiving module 601 and a sending module 603. The receiving module 601 is configured to receive a message A sent by a terminal, and the message A includes a random access preamble sequence and physical uplink shared channel (PUSCH)data; and the sending module 603 is configured to send a first response message or a second response message to the terminal, and the first response message is used to indicate the terminal to send a message 3, the second response message is used to indicate the terminal to send a retransmission message of the message A, and the retransmission message includes at least the PUSCH data.

In some embodiments, the first response message is a message 2 in the 4-step random access procedure.

In some embodiments, the second response message includes resource allocation information, mapping information between a virtual resource block and a physical resource block, a modulation and coding scheme value, and a transport block proportion.

In some embodiments, scheduling information of the first response message is scrambled with first terminal identification information, scheduling information of the second response message is scrambled with second terminal identification information, and the first terminal identification information is different from the second terminal identification information.

In some embodiments, the scheduling information of the second response message includes at least one of retransmission indication information, time advance (TA) information, beam indication information, power indication information, and random access resource indication information, and the retransmission indication information is used to indicate the terminal to send a retransmission message including the PUSCH data, or a retransmission message including the random access preamble sequence and the PUSCH data.

In some embodiments, the sending module 603 is configured to send the first response message or the second response message when determining that the PUSCH data in the message A cannot be parsed.

In some embodiments, the receiving module 601 is configured to receive the message A sent through a pre-configured random access resource.

In some embodiments, the device further includes:

a determining module 603, configured to determine to send the first response message or send the second response message based on random access selection reference information, and the random access selection reference information includes at least one of a user type, an intra-cell interference level, a delay between the terminal and the access network device and a cell load amount.

In a possible implementation, the receiving module 601 is further configured to receive the message 3 sent by the terminal, and the message 3 is sent by the terminal after receiving the first response message; and the sending module 603 is further configured to send a message 4 to the terminal.

In another possible implementation, the receiving module 601 is further configured to receive the retransmission message sent by the terminal, and the retransmission message is sent by the terminal after receiving the second response message; and the sending module 603 is further configured to send a message B to the terminal.

Figure 7:
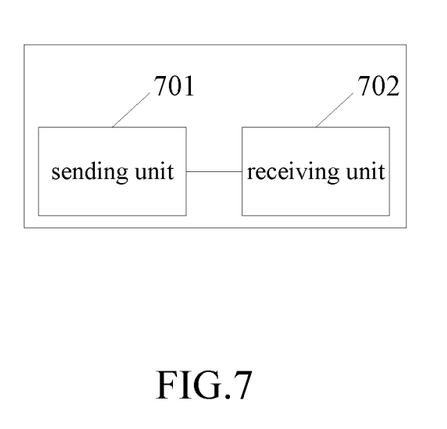
FIG. 7 is a schematic structural diagram showing a random access device according to some embodiments.

FIG. 7 is a schematic structural diagram showing a random access device according to some embodiments. The device has a function of realizing the terminal in the above method embodiments, and the function can be realized by hardware, or by hardware executing corresponding software. As shown in FIG. 7, the device includes: a sending module 701 and a receiving module 702. The sending module 701 is configured to send a message A to an access network device, and the message A includes a random access preamble sequence and PUSCH data. The receiving module 702 is configured to receive a first response message or a second response message sent by the access network device, the first response message is used to indicate the terminal to send a message 3, and the second response message is used to indicate the terminal to send a retransmission message, and the retransmission message includes at least the PUSCH data.

In some embodiments, the first response message is a message 2 in the 4-step random access procedure.

In some embodiments, the second response message includes resource allocation information, mapping information between a virtual resource block and a physical resource block, a modulation and coding scheme value, and a transport block proportion.

In some embodiments, scheduling information of the first response message is scrambled with first terminal identification information, scheduling information of the second response message is scrambled with second terminal identification information, and the first terminal identification information is different from the second terminal identification information.

In some embodiments, the scheduling information of the second response message includes at least one of retransmission indication information, time advance (TA) information, beam indication information, power indication information, and random access resource indication information, and the retransmission indication information is used to indicate the terminal to send a retransmission message including the PUSCH data, or a retransmission message including the random access preamble sequence and the PUSCH data.

In some embodiments, the sending module 701 is configured to send the message A to the access network device through a pre-configured random access resource.

In a possible implementation, the sending module 701 is further configured to send the message 3 to the access network device after receiving the first response message; and the receiving module 702 is further configured to receive a message 4 sent by the access network device.

In another possible implementation, the sending module 701 is further configured to send the retransmission message to the access network device after receiving the second response message; and the receiving module 702 is further configured to receive a message B sent by the access network device.

Figure 8:
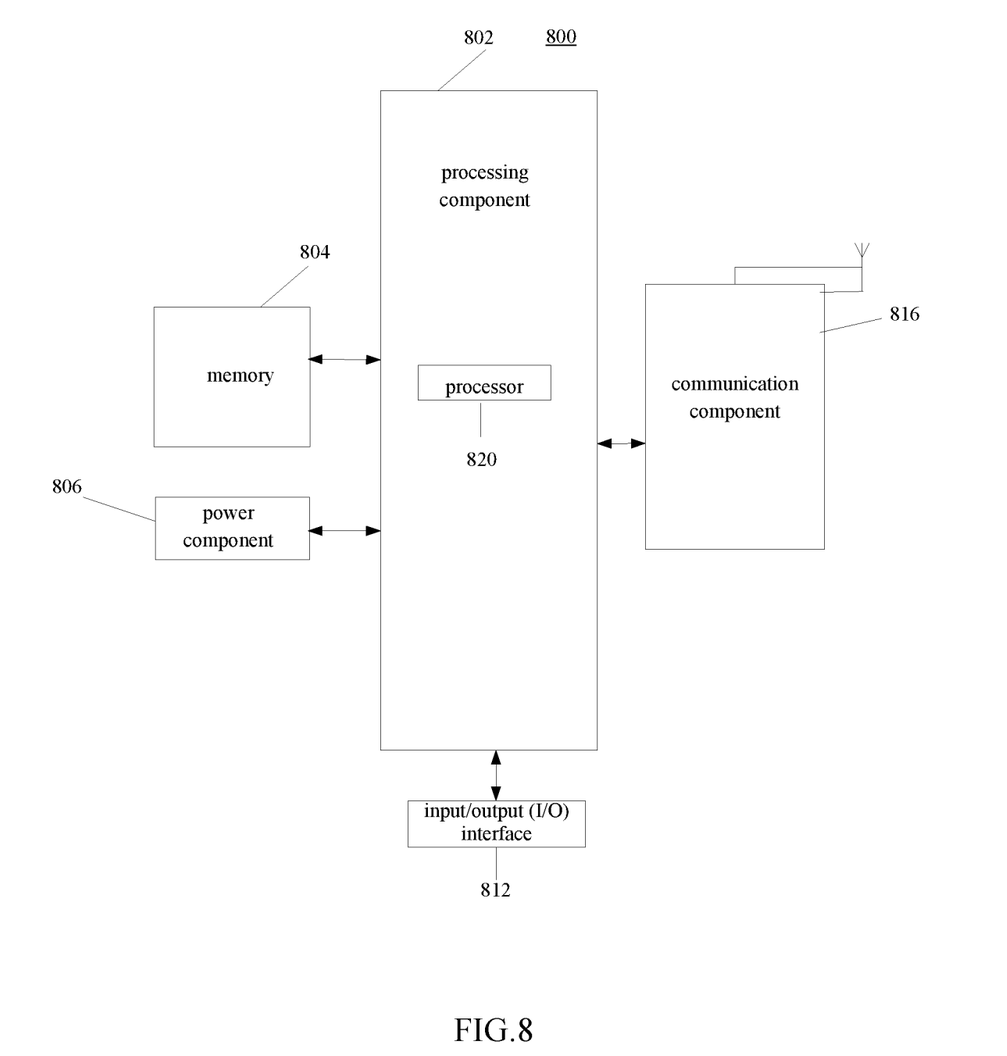
FIG. 8 is a block diagram showing a random access device according to some embodiments.

FIG. 8 is a block diagram showing a random access device 800 according to some embodiments. The device 800 may be the aforementioned access network device. Referring to FIG. 8, the random access device 800 may include one or more of the following components: a processing component 802, a memory 804, a power component 806, an input/output (I/O) interface 812 and a communication component 816.

The processing component 802 typically controls overall operations of the random access device 800, such as the operations associated with display, telephone calls, data communications, camera operations and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module.

The memory 804 is configured to store various types of data to support the operation of the random access device 800. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 provides power to various components of the random access device 800. The power component 806 may include a power management system, one or more power sources, and any other components associated with the generation, management, and distribution of power in the random access device 800.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The communication component 816 is configured to facilitate wireless communication between the random access device and other devices. In the embodiments of the present disclosure, the communication component 816 may provide a wireless network based on a communication standard, such as 2G, 3G, 4G, or 5G, or a combination thereof, so as to connect with the terminal device.

In exemplary embodiments, the random access device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above random access method.

Figure 9:
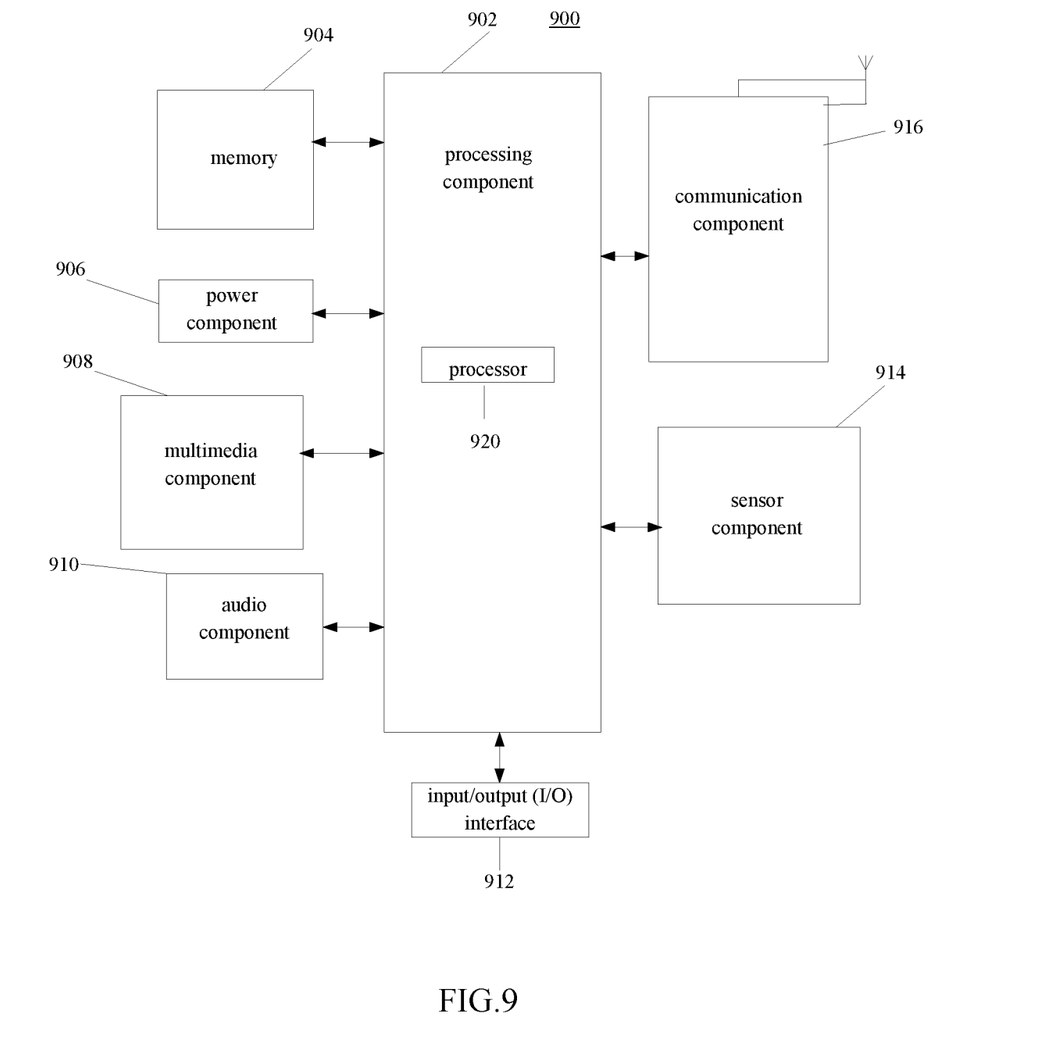
FIG. 9 is a block diagram showing a random access device according to some embodiments.

In exemplary embodiments, there is also provided a non-transitory computer readable storage medium including instructions, such as the memory 804 including instructions executable by the processor 820 of the random access device 800 to perform the above random access method. For example, the non-transitory computer-readable storage medium may be a ROM, a random access memory (RAM), a CD-ROM, a magnetic tape, a floppy disc, an optical data storage device, and the like FIG. 9 is a block diagram showing a random access device 900 according to some embodiments. The device 900 may be the aforementioned terminal. Referring to FIG. 9, the random access device 900 may include one or more of the following components: a processing component 902, a memory 904, a power component 906, a multimedia component 908, an audio component 910, an input/output (I/O) interface 912, a sensor component 914 and a communication component 916.

The processing component 902 typically controls overall operations of the random access device 900, such as the operations associated with display, telephone calls, data communications, camera operations and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the random access device 900. Examples of such data include instructions for any applications or methods operated on the random access device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 906 provides power to various components of the random access device 900. The power component 906 may include a power management system, one or more power sources, and any other components associated with the generation, management, and distribution of power in the random access device 900.

The multimedia component 908 includes a screen providing an output interface between the random access device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the random access device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the random access device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the random access device 900. For instance, the sensor component 914 may detect an open/closed status of the random access device 900, relative positioning of components, e.g., the display and the keypad, of the random access device 900, a change in position of the random access device 900 or a component of the random access device 900, a presence or absence of user contact with the random access device 900, an orientation or an acceleration/deceleration of the random access device 900, and a change in temperature of the random access device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate wireless communication between the random access device 900 and other devices. In the embodiments of the present disclosure, the communication component 916 can access the wireless network based on a communication standard, such as 2G, 3G, 4G, or 5G, or a combination thereof, so as to realize random access. In some embodiments, the communication component 916 receives a broadcast signal or broadcast associated information from an external broadcast management system via a broadcast channel. In some embodiments, the communication component 916 further includes a near field communication (NFC) module.

In exemplary embodiments, the random access device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above the above random access method.

In exemplary embodiments, there is also provided a non-transitory computer readable storage medium including instructions, such as the memory 904 including instructions executable by the processor 920 of the random access device 900 to perform the above random access method. For example, the non-transitory computer-readable storage medium may be a ROM, a random access memory (RAM), a CD-ROM, a magnetic tape, a floppy disc, an optical data storage device, and the like Some embodiments of the present disclosure also provides a random access system, and the random access system includes an access network device and a terminal. The access network device is the random access device provided in the embodiment shown in FIG. 8, and the terminal is the random access device provided in the embodiment shown in FIG. 9.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A random access method, comprising:
   receiving, by an access network device, a message A sent by a terminal, wherein the message A comprises a random access preamble sequence and physical uplink shared channel (PUSCH) data;
   sending, by the access network device, a first response message or a second response message to the terminal when determining that the PUSCH data in the message A fails to be parsed, wherein the first response message is used to indicate the terminal to send a message 3 in a 4-step random access procedure, the second response message is used to indicate the terminal to send a retransmission message of the message A, and the retransmission message comprises at least the PUSCH data; and
   determining, by the access network device, to send the first response message or send the second response message based on random access selection reference information, wherein the random access selection reference information comprises at least one of a user type, an intra-cell interference level, a delay between the terminal and the access network device and a cell load amount.

2. The method according to claim 1, wherein the first response message is a message 2 in the 4-step random access procedure.

3. The method according to claim 1, wherein the second response message comprises at least one of resource allocation information, mapping information between a virtual resource block and a physical resource block, a modulation and coding scheme value, and a transport block proportion.

4. The method according to claim 1, wherein scheduling information of the first response message is scrambled with first terminal identification information, scheduling information of the second response message is scrambled with second terminal identification information, and the first terminal identification information is different from the second terminal identification information.

5. The method according to claim 1, wherein scheduling information of the second response message comprises at least one of retransmission indication information, time advance (TA) information, beam indication information, power indication information, and random access resource indication information, and the retransmission indication information is used to indicate the terminal to send a retransmission message comprising the PUSCH data, or to send a retransmission message comprising the random access preamble sequence and the PUSCH data.

6. The method according to claim 1, wherein the method further comprises:
   receiving, by the access network device, the message 3 sent by the terminal, wherein the message 3 is sent by the terminal after receiving the first response message; and
   sending, by the access network device, a message 4 to the terminal;
   or,
   the method further comprises:
   receiving, by the access network device, the retransmission message sent by the terminal, wherein the retransmission message is sent by the terminal after receiving the second response message; and
   sending, by the access network device, a message B to the terminal.

7. A random access method, comprising:
   sending, by a terminal, a message A to an access network device, wherein the message A comprises a random access preamble sequence and physical uplink shared channel (PUSCH) data; and
   receiving, by the terminal, a first response message or a second response message sent by the access network device based on random access selection reference information, wherein the first response message is used to indicate the terminal to send a message 3 in a 4-step random access procedure, the second response message is used to indicate the terminal to send a retransmission message, the retransmission message comprises at least the PUSCH data, and wherein the random access selection reference information comprises at least one of a user type, an intra-cell interference level, a latency between an expected reception time and an actual reception time of a measurement signal by the access network device.

8. The method according to claim 7, wherein the first response message is a message 2 in the 4-step random access procedure.

9. The method according to claim 7, wherein the second response message comprises at least one of resource allocation information, mapping information between a virtual resource block and a physical resource block, a modulation and coding scheme value, and a transport block proportion.

10. The method according to claim 7, wherein scheduling information of the first response message is scrambled with first terminal identification information, scheduling information of the second response message is scrambled with second terminal identification information, and the first terminal identification information is different from the second terminal identification information.

11. The method according to claim 7, wherein scheduling information of the second response message comprises at least one of retransmission indication information, time advance (TA) information, beam indication information, power indication information, and random access resource indication information, and the retransmission indication information is used to indicate the terminal to send a retransmission message comprising the PUSCH data, or send a retransmission message comprising the random access preamble sequence and the PUSCH data.

12. The method according to claim 7, wherein the method further comprises:
sending, by the terminal, the message 3 to the access network device after receiving the first response message; and
receiving, by the terminal, a message 4 sent by the access network device;
or, the method further comprises:
sending, by the terminal, the retransmission message to the access network device after receiving the second response message; and
receiving, by the terminal, a message B sent by the access network device.

13. A random access device, comprising:
a processor; and
a memory for storing executable instructions of the processor;
wherein the processor is configured to load and execute the executable instructions to implement:
receiving a message A sent by a terminal, wherein the message A comprises a random access preamble sequence and physical uplink shared channel (PUSCH) data;
sending a first response message or a second response message to the terminal when determining that the PUSCH data in the message A fails to be parsed, wherein the first response message is used to indicate the terminal to send a message 3 in a 4-step random access procedure, the second response message is used to indicate the terminal to send a retransmission message of the message A, and the retransmission message comprises at least the PUSCH data; and
determining to send the first response message or send the second response message based on random access selection reference information, wherein the random access selection reference information comprises at least one of a user type, an intra-cell interference level, a delay between the terminal and an access network device and a cell load amount.

14. The device according to claim 13, wherein the first response message is a message 2 in the 4-step random access procedure.

15. The device according to claim 13, wherein the second response message comprises at least one of resource allocation information, mapping information between a virtual resource block and a physical resource block, a modulation and coding scheme value, and a transport block proportion.

16. The device according to claim 13, wherein scheduling information of the first response message is scrambled with first terminal identification information, scheduling information of the second response message is scrambled with second terminal identification information, and the first terminal identification information is different from the second terminal identification information.

17. The device according to claim 13, wherein scheduling information of the second response message comprises at least one of retransmission indication information, time advance (TA) information, beam indication information, power indication information, and random access resource indication information, and the retransmission indication information is used to indicate the terminal to send a retransmission message comprising the PUSCH data, or to send a retransmission message comprising the random access preamble sequence and the PUSCH data.

18. The device according to claim 13, wherein
the processor is further configured to receive the message 3 sent by the terminal, wherein the message 3 is sent by the terminal after receiving the first response message; and the processor is further configured to send a message 4 to the terminal;
or,
the processor is further configured to receive the retransmission message sent by the terminal, wherein the retransmission message is sent by the terminal after receiving the second response message; and the processor is further configured to send a message B to the terminal.

19. A random access device implementing the method according to claim 7, comprising:
a processor; and
a memory for storing executable instructions of the processor;
wherein the processor is configured to load and execute the executable instructions to implement operations of the method.

* * * * *